United States Patent [19]
Saval et al.

[11] Patent Number: 5,551,143
[45] Date of Patent: Sep. 3, 1996

[54] ROTOR SHAFT HAVING LEAD WIRE PASSAGE SLOTS AND METHOD OF FORMING COLLAR SUPPORT BY COLD HEADING

[75] Inventors: Joseph E. Saval, Romulus; Timothy J. Brunetz, Tecumseh, both of Mich.

[73] Assignee: Ford Motor Company, Dearborn, Mich.

[21] Appl. No.: 327,068

[22] Filed: Oct. 21, 1994

Related U.S. Application Data

[63] Continuation-in-part of Ser. No. 972,332, Nov. 6, 1992, abandoned.

[51] Int. Cl.$^6$ ............................................. H02K 15/14
[52] U.S. Cl. ............................. 29/598; 310/42; 310/90; 310/263
[58] Field of Search ........................... 29/596, 598, 597; 310/90, 42, 43, 234, 235, 263

[56] References Cited

U.S. PATENT DOCUMENTS

| | | | |
|---|---|---|---|
| 3,785,049 | 1/1974 | Kanamura et al. | 29/629 |
| 3,842,301 | 10/1974 | Smith | 310/232 |
| 3,916,237 | 10/1975 | Hausmann | 310/236 |
| 4,360,749 | 11/1982 | Neumann et al. | 310/42 |
| 4,406,961 | 9/1983 | Pflüger et al. | 310/232 |
| 4,419,597 | 12/1983 | Shiga et al. | 310/68 D |
| 4,492,885 | 1/1985 | Kitamura et al. | 310/62 |
| 4,565,936 | 1/1986 | Ikegami et al. | 310/62 |
| 4,618,793 | 10/1986 | Shizuka et al. | 310/232 |
| 5,016,340 | 5/1991 | Kato | 29/598 |

FOREIGN PATENT DOCUMENTS

0116577  6/1918  United Kingdom.

*Primary Examiner*—Carl E. Hall
*Attorney, Agent, or Firm*—Mark S. Sparschu; Roger L. May

[57] ABSTRACT

A rotor shaft for electro-dynamic machinery such as a motor vehicle alternator includes a cold-headed slot through a bearing land formed on the shaft. The slot extends axially through a bearing land and either extends radially through a collar portion adjacent the bearing land, or communicates with a radially aligned shaped conductor on a slip ring. Preferably, two diametrically opposed slots are formed, and the slots provide a means for aligning the wires, for example, prior to encapsulation of the rotor by injection molding, while positioning the leads for engagement with the winding terminals and with the conductor rings on the slip ring bushing. Preferably, the shaft is made by a sequential set of cold heading steps which avoid deformation or uneven formation of the groove. A cold headed shaft formed without a collar is preferably through-fed in a single direction through one or more machining stations for production efficiency.

11 Claims, 5 Drawing Sheets

ROTOR SHAFT HAVING LEAD WIRE PASSAGE SLOTS AND METHOD OF FORMING COLLAR SUPPORT BY COLD HEADING

CROSS REFERENCE TO RELATED APPLICATION

This application is a continuation-in-part application of U.S. Ser. No. 07/972,332, filed Nov. 6, 1992, now abandoned.

FIELD OF THE INVENTION

The present invention relates generally to electro-dynamic machinery such as alternator constructions, and more particularly to a rotor shaft with a cold headed groove formed through one of the bearing lands.

BACKGROUND ART

Rotary electric machines include windings and supporting hardware that occupy substantial space. However, attempts have been made to reduce the size and simplify the construction of such a device. For example, alternators used in motor vehicles have been axially shortened as a result of a rearrangement of the components making up the device. In one previously known improvement, a slip ring is carried on an end of the rotor shaft, while bearing lands are formed on opposite ends of the rotor carrying land of the alternator shaft. Rearrangement of the slip rings to the shaft end permits the rings to be carried outside of the housing, and substantially reduces the axial length of the housing protecting the windings by reducing the axial distance between the bearings used to support the shaft.

Although the reduced axial dimension provides improved packaging for the alternator, the connection of the conductors on the slip ring with the coil windings on the rotor becomes more difficult because the ring is no longer next to the rotor assembly and the bearing obstructs connection of the rings to the rotor. Accordingly it has been found useful to provide a slot in the shaft through which conductors such as lead wires can be extended from a slip ring to a terminal at the winding on the rotor. Although the slot may be provided by milling the shaft after it is formed, such a separate machining operation is undesirable as it substantially increases the expenses and prolongs the time for manufacturing of the device. For example, a milling operation which cuts the slot must be followed by a finishing step such as a deburring operation to assure that sharp edges do not interfere with further handling or assembly operations.

Nevertheless, assembly operations other than machining would not readily appear to be applicable to construction of the slot in previously known alternator rotor shafts. British Patent No. 116,577 and U.S. Pat. No. 3,842,301 show slots or grooves to carry lead wires to the slip rings. However, the wedge, shaped slot of the British patent and the arcuate groove of Smith's patent are not disclosed as being formed by cold heading.

The prior art also does not disclose cold heading operations for alternator shafts. In a cold heading operation, the grooves formed in a land can extend no deeper than the maximum diameter of the adjacent portion of the shaft without deforming the surface of the adjacent portion. However, in a cold heading operation, the maximum reduction in shaft diameter which can be obtained is quite limited, for example, by the material properties of the blank used to form the shaft. As a result, the limitations on minimum diameter of the adjacent portion of the shaft and the limited depth of the groove in the land of the shaft have been avoided in the alternator shafts of the prior art by relying upon machining, and would be considered undesirable design parameters for cold heading of the shaft. For example, for grooves in bearing lands adjacent a narrow shaft end for receiving the slip ring of an alternator rotor shaft, a machining operation has conventionally been used.

As a result, the previously discussed machining operations are conventionally used to provide slots as conductor grooves for lead wires in an alternator shaft in order to reach the slip rings despite the time, labor and expense necessary to provide such a structure.

SUMMARY OF THE INVENTION

The present invention overcomes the above-mentioned disadvantages by providing a shaft for an electrical device, such as an alternator for motor vehicles, which includes at least one cold headed slot adapted to receive conductor leads between slip ring portion and the rotor windings, and made possible by a unique method of forming the shaft by a cold heading technique. The cold heading operation extrudes an axial slot in the shaft, preferably through a bearing land. In the preferred embodiment, one version of the cold heading operation includes the formation of a collar adjacent to the bearing land on the shaft with the cold headed slot. The lead wire slots are then extended radially outwardly to the periphery of the collar to direct the connectors toward the winding terminals. In another version, the cold heading operation extrudes a maximized diameter shaft without the collar so that the shaft may be through-fed in a single axial direction for machining operations such as threading or knurling. This maximized diameter shaft is then machined and coupled to a slip ring formed with insert injection molding to form an insulated conductor that can be directed radially away from the shaft.

The present invention also includes a preferred method for cold heading the shaft which includes the steps of initiating preferably symmetric cold heading of the slip ring end portion, then extruding at least one slot axially through the adjacent bearing land portion of the shaft. Preferably, the initial cold headed slot through the bearing land terminates short of the area at which a collar is to be upset by cold heading. Next the collar is upset by cold heading and the slot is extended by cold heading into the collar portion in alignment with the axially extending grooves. Of course, other structures, such as a press fit collar which can be aligned with the cold headed slot in the shaft, could also be used to extend the slot or otherwise align the conductors in accordance with the present invention. With a maximized diameter shaft, the machining such as knurling can be simply accomplished in a through-feed process to avoid complicated multiple direction part movements.

Preferably, two slots are formed, each slot being on diametrically opposed sides of the blank during the cold heading operation. Symmetrical positioning of the grooves provides symmetry of metal flow and thus improves the quality of the cold headed parts.

Thus the present invention provides an alternator construction in which the shaft can provide a compact, pancake arrangement for the alternator windings. Moreover, the rotor shaft is conveniently and economically formed without the substantial expense required by previously known machining operations or the shape limitations of machined slots previously used to form rotor shaft grooves. A cold headed slot through the bearing land provides a substantially less expensive production process for slotting the shaft than previously known forging or machining operations, and preferably, the entire shaft can be formed in the cold heading process. Nevertheless, the slots are accurately formed so as to avoid unnecessary movement or misalignment of the conductors, particularly during assembly. As a result, the construction of the alternator can be substantially simpler and less expensive than those with previously known shaft constructions, particularly those intended for use in pancake style alternators having reduced axial length between the bearings supporting the shaft in the housing.

Accordingly it is an object of this invention to form a shaft with an axial groove therein by a cold heading method. It is a more specific object of this invention to form the end of a rotor shaft by sequential or successive cold heading method steps which form a land on the shaft, an axial groove in the land, and substantially concurrently, a collar at one end of the land with a radially extending groove as a substantial continuation of the axial groove. It is another specific object to simplify formation of an alternator shaft by a process combining cold heading fabrication including forming axial conductor recesses with through-feed processing.

Another object of this invention is a rotor shaft for an electro-mechanical apparatus such as an alternator having a rotor winding and bearings adjacent to the rotor winding including an end portion adapted to receive a slip ring, a first bearing support portion adjacent the end portion, the first support portion having a radially extending collar or a shaped slip ring conductor, a rotor land adjacent to the collar or to the slip ring conductor, a second bearing support portion, and a first bearing support portion including at least one axially extending groove formed by cold heading. The collar or slip ring aligns at least one radially extending conductor for communicating with the axially extending cold headed groove.

A still further object of this invention is an alternator consisting of a stator housing supporting stator windings; a rotor winding, a shaft having a rotor land carrying the rotor winding, and also having first and second bearing lands adjacent opposite ends of the rotor land, the first bearing land having a collar; first and second bearings supporting the shaft at the first and second bearing lands, respectively; a slip ring carrying conductor rings on a reduced-diameter slip ring land extending from the first bearing land to an end of the shaft, at least one cold headed slot extending axially in the first bearing land and radially extending to the periphery of the collar, and at least one conductor extending through each cold headed slot, coupling a conductor ring to a rotor winding terminal; and a regulator means for regulating the generated voltage delivered to the slip rings; and a rectifier for transforming output from the stator winding to a continuous D.C. signal. Alternatively, an alternator construction includes a shaft without the collar whereby the radial groove is replaced by a slip ring designed with conductors that radially branch from the axially extending groove.

BRIEF DESCRIPTION OF THE DRAWINGS

The present invention will be better understood with reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
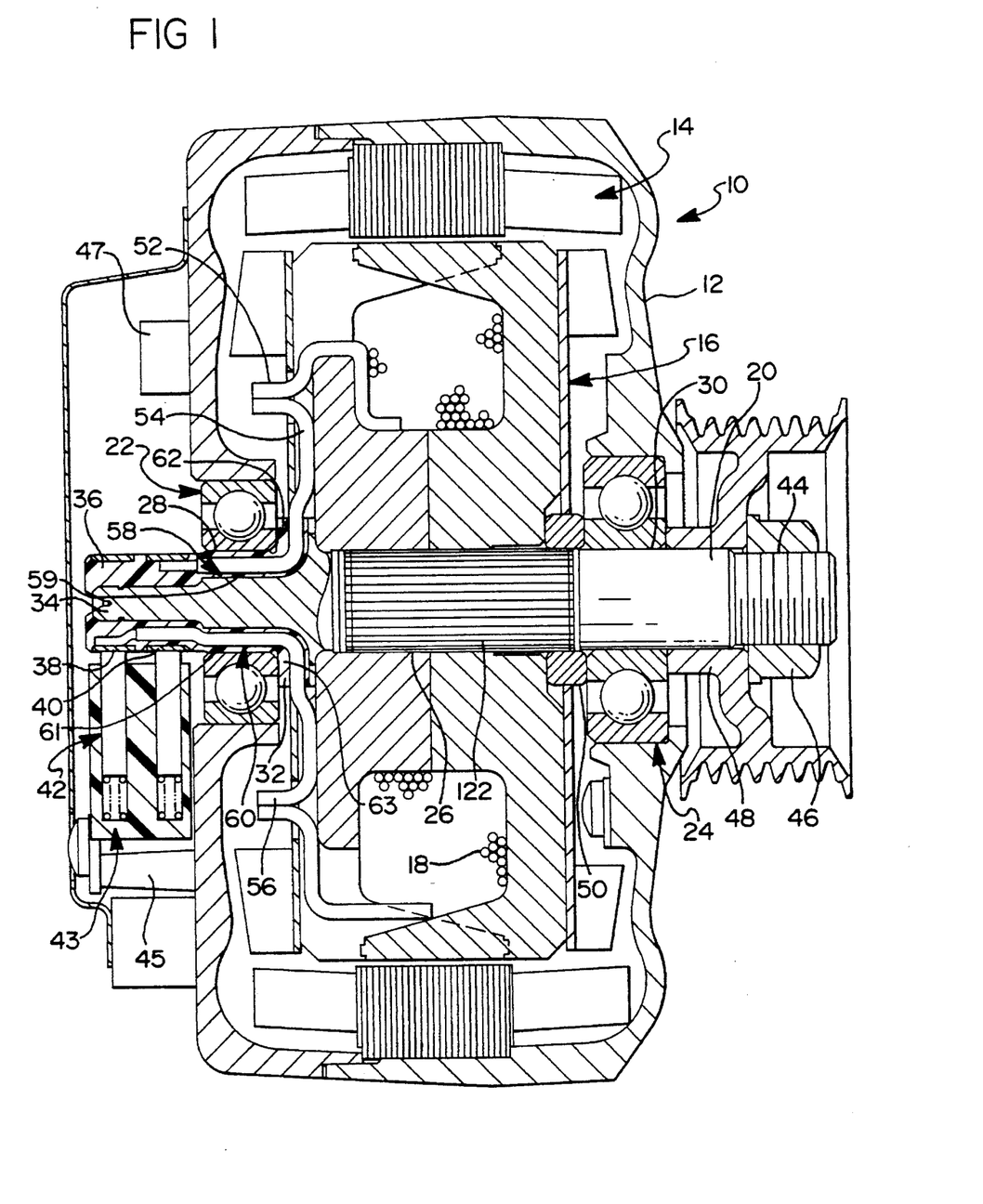
FIG. 1 is a sectional view of an alternator with a rotor shaft constructed according to the present invention.

Referring first to FIG. 1, an alternator 10 includes a stator housing 12 carrying a stator winding 14. The alternator also includes a rotor 16 carrying a rotor winding 18 and carried by a shaft 20 rotatably supported in the housing 12 by bearings 22 and 24. While the rotor and stator windings may be of conventional design, it is to be understood that the alternator structure of the preferred embodiment is a pancake design in which the bearings are adjacent opposite axial sides of the rotor. Nevertheless, it is to be understood that the invention is not so limited, and the shaft construction including a cold headed slot, as utilized in the preferred embodiment, is applicable to rotary electro-mechanical devices in general, and the claims should be so interpreted.

The shaft 20 (see also FIG. 9) includes a rotor land 26 having knurling or other surface features for securing the poles of the rotor. The shaft includes bearing lands 28 and 30 adjacent opposite axial sides of the rotor land 26. The first bearing land 28 engaging the inner ring of the bearing 22 includes a radially enlarged collar 32. The end of the shaft adjacent the first bearing land 28 has a reduced diameter slip-ring portion 34 adapted to receive the slip ring bushing 36. The slip ring bushing 36 includes separated, electrically conductive slip rings 38 and 40 that engage a set of brushes 42 in a well known manner. The brush assembly 43 includes a regulator means 45 for regulating the generated voltage delivered across the slip rings to power the field or rotor winding. In addition, the alternator includes a rectifier, shown diagrammatically at 47 in FIG. 1, for rectifying the output from the stator winding and transforming the A.C. pulses to a continuous D.C. signal in a well known manner.

The second bearing land 30 lies adjacent a mounting end 44 which is threaded to engage a correspondingly threaded nut 46. Tightening of the nut 46 on the shaft 20 engages a pulley sleeve 48 against the inner ring of the bearing 24 which in turn axially engages a thrust ring 50 pressing the rotor poles against the raised collar 32.

The rotor 16 carries a field winding terminal for each end of the coil 18. Each winding terminal 52, 53 is coupled to one of the slip rings 40, 38 by a conductor such as the lead wires 54 and 56, respectively. Each lead wire 54 and 56 extends through one of the slots or grooves 58 and 60, respectively, on diametrically opposed sides of the shaft 20. Each groove 58 and 60 has an axial portion 59, 61 which extends axially along the first bearing land 28 and a radial portion 62, 63 which extends radially through the collar 32.

Unlike previously known shaft grooves, the grooves 58 and 60 are formed by cold heading, and thus substantially reduce the production cost of the shaft and the alternator. Unlike previously known milling operations used to form grooves, the groove formed by cold heading does not need to be deburred in order to provide a finished product for assembly into the alternator. Although only the groove itself need be formed by cold heading, it will be understood that the cold heading operation is most cost effective when the various shaft portions throughout the length of the shaft are formed in sequential cold heading steps. A preferred series of steps in forming a blank to make an alternator shaft according to the present invention is described in greater detail, but it will be understood that the number of steps used in sequentially cold heading portions of the slotted shaft need not be so limited depending upon the materials, the dimensions, the shape of the blank, the tool insert configuration, and the tools and the presses available for the cold heading operation.

Figure 2:
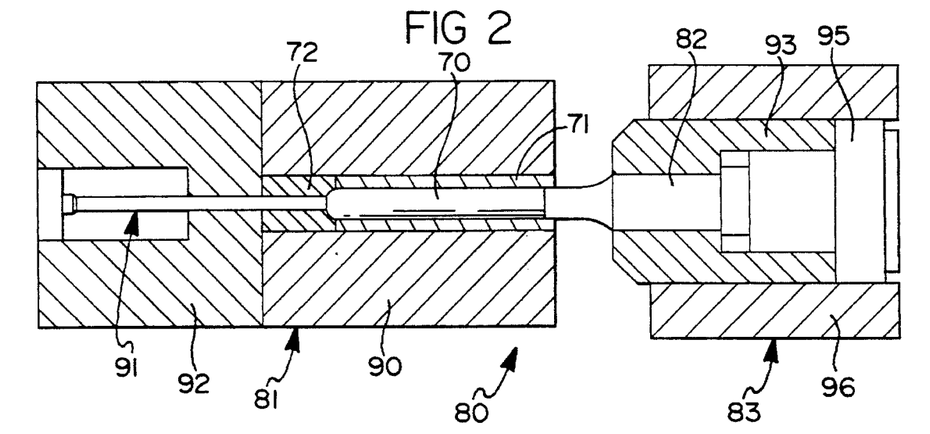
FIG. 2 is a sectional view of a tooling arrangement for cold heading a blank forming a shaft according to the present invention.
Figure 3:
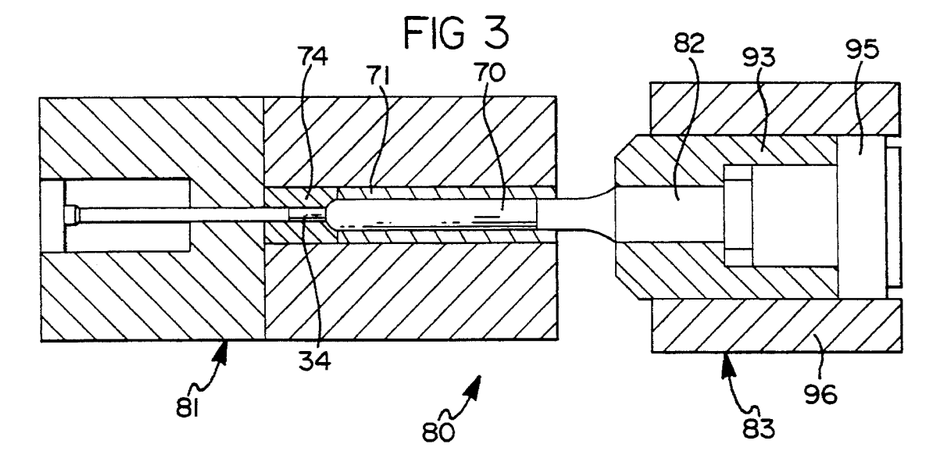
FIG. 3 is a sectional view of a tooling arrangement used in forming a progression subsequent to FIG. 2.
Figure 4:
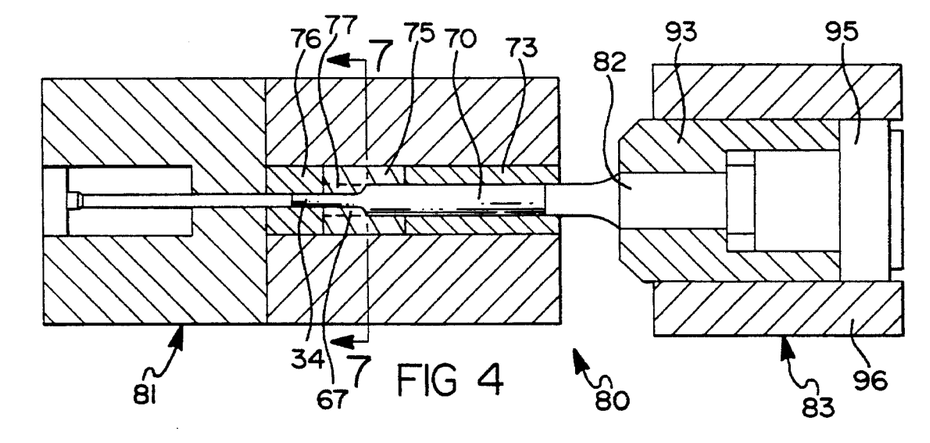
FIG. 4 is a sectional view of a tooling arrangement showing another progression subsequent to FIG. 3.
Figure 5:
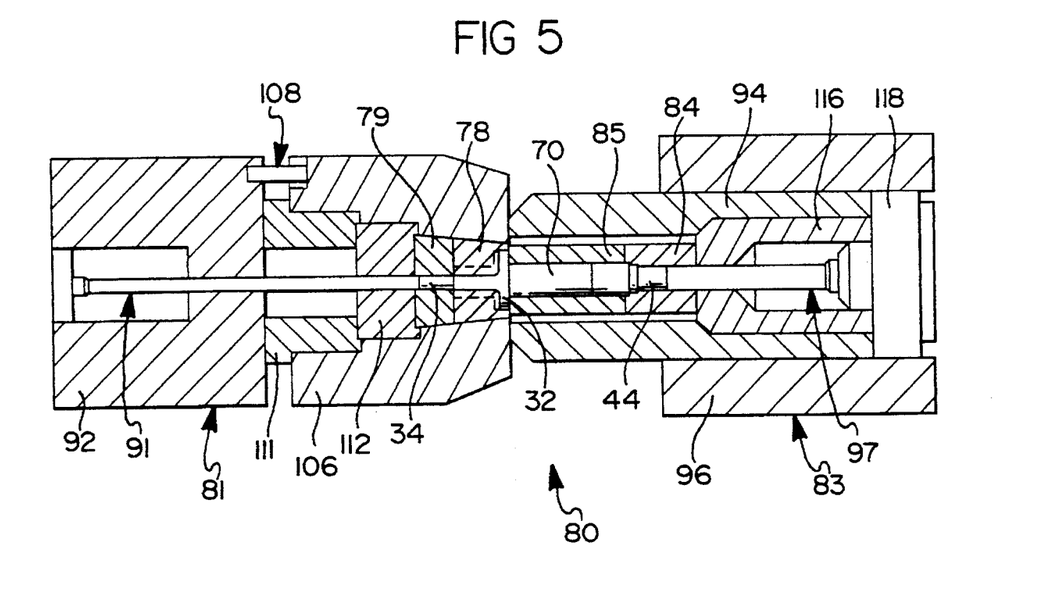
FIG. 5 is a sectional view of a tooling arrangement showing further progression subsequent to FIG. 4.
Figure 6:
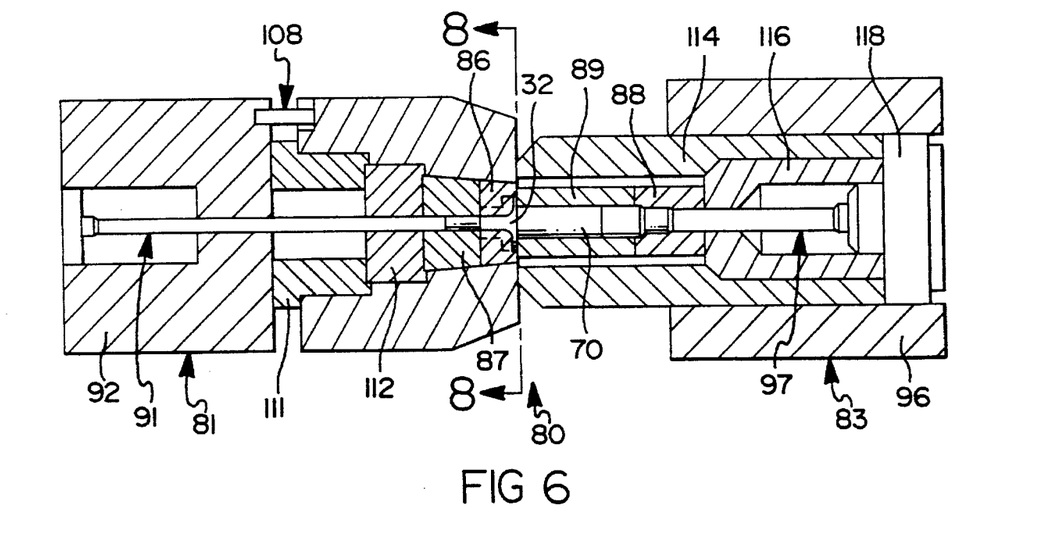
FIG. 6 is a sectional view of a tooling arrangement showing a progression subsequent to FIG. 5.

Referring now to FIG. 2, a tooling arrangement or die package 80 comprises a die section 81 and a tool section 83. The die section 81 includes a die case 90 and a die backing 92, as well as one or more die inserts such as 71 and 72 as discussed in detail later, in the manner of well known cold heading presses. A powered forward, unpowered return, knockout pin reciprocates to displace the blank from the inserts after cold heading, in a well known manner as diagrammatically shown at 91. Similarly, the tool section 83 includes a tool holder 93 for holding a punch 82 and punch backing 95 within the bolster 96 as shown in FIGS. 2 through 4. In FIGS. 5 and 6, the tool holder 94 includes one or more tool inserts in addition to a reciprocating knockout pin assembly 97 similar in function to knockout pin assembly 91. However, each representation of the die package 80 in FIGS. 2–6 demonstrate an end-of-stroke punch position.

In FIG. 2, a blank 70 which is to form the shaft 20 is shown inserted in the cold heading die package 80 in which the punch 82 forces the blank 70 into die insert 71 and against a die extruding insert 72 that extrudes and tapers the blank for reduction as shown. The initial extruding step permits the end of the blank to reach a smaller diameter in subsequent process steps.

FIG. 3 demonstrates the next subsequent process step in which the extruding insert 74 and die insert 71 permit continued formation of the reduced diameter, slip ring receiving, end portion 34 of the shaft. The die insert 74 shown in FIG. 3 may be the same as insert 72 as it is to be understood that the figures may represent first and second strokes of a single die package. However, in the preferred embodiment, the inserts 72 and 74 differ slightly in the dimensions of the forming surfaces of the inserts that provide symmetrically extruded portions on the blank. Furthermore, as with all extruding inserts, the inserts include radial relief of about 0.002–0.003 inch axially beyond the extrusion surface length about 0.060 inch, to minimize frictional resistance to displacement of the blank in the inserts.

In FIG. 4, the partially formed blank 70 has been engaged in die insert 76 which receives the end portion 34, and the die insert 75 is provided to form at least one, but preferably two, axial groove portions 59, 61 respectively, in the shaft portion adjacent end 34. As was previously discussed, conventional cold heading processes substantially limit the reduction in shaft diameter that can be obtained in the cold heading process. Nevertheless, slots to be cold headed into the shaft must be deep enough to carry the conductors but cannot be formed to a depth greater than the outer diameter of the reduced shaft end 34. Furthermore, in the cold heading process, the shaft diameter at the bottom of the groove preferably exceeds the maximum diameter of the end portion 34 in order to avoid contact with the slip ring end portion being formed, since marring or scraping of the shaft end would require additional finishing.

Figures 7, 8, 9:
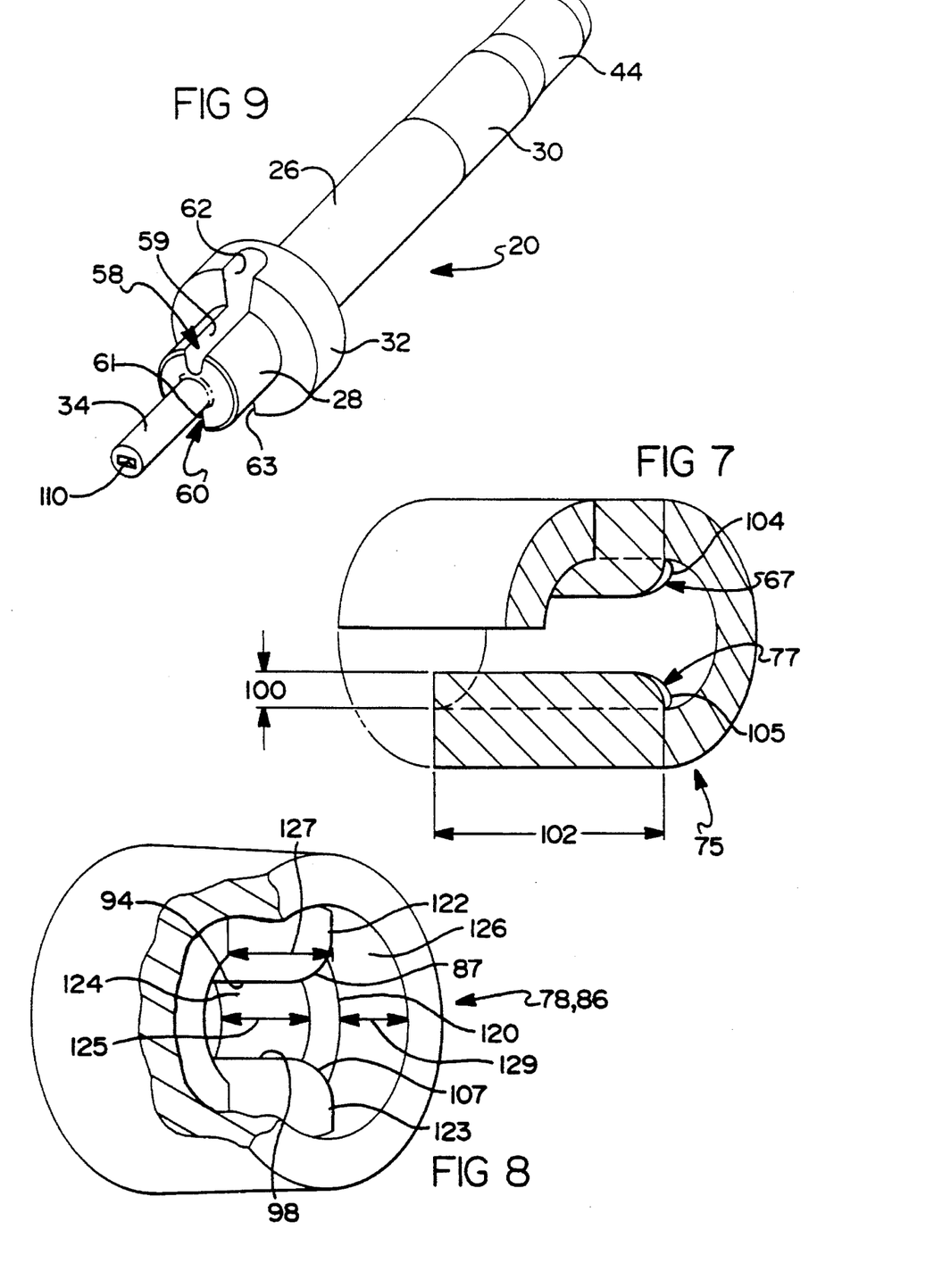
FIG. 7 is a sectional, perspective view of a die insert taken substantially along line 7—7 in FIG. 4 and partially broken away.
FIG. 8 is a perspective view of another die insert configuration partially broken away and taken substantially along line 8—8 in FIG. 6 representing a typical configuration for each of the die inserts shown in FIGS. 5 and 6 at that location.
FIG. 9 is a perspective view of the rotor shaft blank constructed in part by the die inserts of FIGS. 7 and 8.

As best shown in FIG. 7, the die insert has two diametrically opposed ribs 67, 77 that have a radial height 100 that does not reach to the surface of shaft end 34 on the shaft blank 70. The ribs 67, 77 also have an axial length 102 consistent with the length of bearing land 28, and each rib has a curved leading edge 104, 105.

Preferably, the axial length 102 is limited so that the grooves terminate short of the axial shaft position at which the collar 30 is to be formed so that formation of the collar does not unduly expand or otherwise deform the groove during formation of the collar. It has been found that an axial groove portion 59, 61 which is too long before formation of the collar causes the groove to be spread or widely angled in the collar and does not provide a proper fit for the conductors, such as leads 54 and 56, during assembly on the finished shaft. Of course, as well known for extruding inserts, the ribs 67, 77 are relieved rearwardly of the extruding surface as previously discussed for inserts 72 and 74.

Although rotational alignment of the blank in the die package 80 shown in FIGS. 2 and 3 is not critical as the die inserts act symmetrically upon the blank, the formation of diametrically opposed grooves as shown in FIG. 4 requires that the blank 70 be properly aligned in subsequent stages of the cold heading process. As seen in FIG. 5, the end of the knockout pin 91 indexes the shaft by conforming with an indexing groove 110, called a whistle-notch, formed at the axial end of the partially formed blank 70, see FIG. 9. The whistle-notch 110 mates with the conforming end of the knockout pin to prealign the blank before the additional cold heading strokes are performed upon the blank.

In addition to alignment of the blank, the die inserts themselves must be aligned in proper orientation. Accordingly, the die case 106 holding die inserts 78 and 79 is properly oriented with respect to the die backing 92 in a well known manner as diagrammatically indicated by the alignment pin 108. In addition, the threaded filler 111 presses against the die filler 112 to secure the inserts 78 and 79 in the die case 106.

In addition, FIGS. 5 and 6 disclose a tool section 83 including tool inserts 84, 85 and 88, 89 respectively, for extruding additional portions on the blank 70. Tool section 83 includes a tool holder 114 carrying a tool filler 116 retained by a punch backing 118 within the bolster 96.

Referring now to FIGS. 5 and 8, die insert 78 adjacent die insert 79 initiates upsetting of the collar 32 on the partially formed blank 70. The die insert 78 preferably also initiates formation of the radially extending groove portions 62, 63 in collar 32 by rib projections 87, 107 that continue from the axial rib portions 94, 98 aligned in the axial grooves 59, 61 in the first bearing land 28 of the blank 70. In addition, the cold heading tool section 83 is provided with tool inserts 84 and 85 for extruding the other bearing land 30 and mounting end 44 on the blank 70. In the preferred embodiment, the mounting end 44 is not subjected to as great a size reduction as required at the slip ring supporting portion of the shaft at the other end 34, and thus is formed in combination with the step used for starting formation of the collar 32.

In the cold heading step shown in FIG. 6, the radial groove extending through the collar 32, and the collar 32, are completed by the die inserts 86 and 87 while the bearing land 30 and mounting portion 44 are completed at the other end of the blank 70 by tool inserts 88 and 89. As best shown in FIG. 8 an end view of the die insert 78 is also typical of die insert 86. However, the axial projection 127 of the typical radial rib portions 122, 123 from the surface of annular shoulder 120 is longer in die insert 86 than the axial projection of such ribs 122, 123 in die insert 78. Moreover, the axial length 125 of the typical die insert portion 124 in die insert 86 surrounding the bearing land 28 is reduced compared to the axial length of such die insert portion 124 surrounding the bearing land area in die insert 78. In addition, the die insert portion 126 surrounding the collar 32 in die insert 86 is as shown at 129 is longer than such initial collar forming surfaces 126 in insert 78 so that metal is extruded from the bearing land 28 toward the collar 32 to increase the axial length of the collar 32. The relative proportions of axial and radial rib lengths in the two inserts 78 and 86 is also shown in their sectional views in FIGS. 5 and 6 respectively.

Of course, it will be understood that additional operations may also be performed on the blank 70 to complete the shaft 20 shown in FIG. 1. In particular, the end portion 44 will be threaded in a well known manner to receive nut 46. In addition, knurling 122 on the rotor land 26 is preferably provided for secure mounting of the rotor. While knurling has been formed in a subsequent cold roll, knurling operation, it would also be possible to cold head the knurling during the cold heading process.

When the rotor assembly for the alternator is being constructed with the shaft 20, the lead wires may be encapsulated in the grooves. Preferably, the encapsulation is provided during an injection molding operation where the slip ring is insert molded about the shaft. The slip ring, lead wire encapsulation and other components may be simultaneously formed from thermoplastic material as shown in FIG. 1 during a molding process with the shaft inserted in a mold in a well-known manner.

Figure 10:
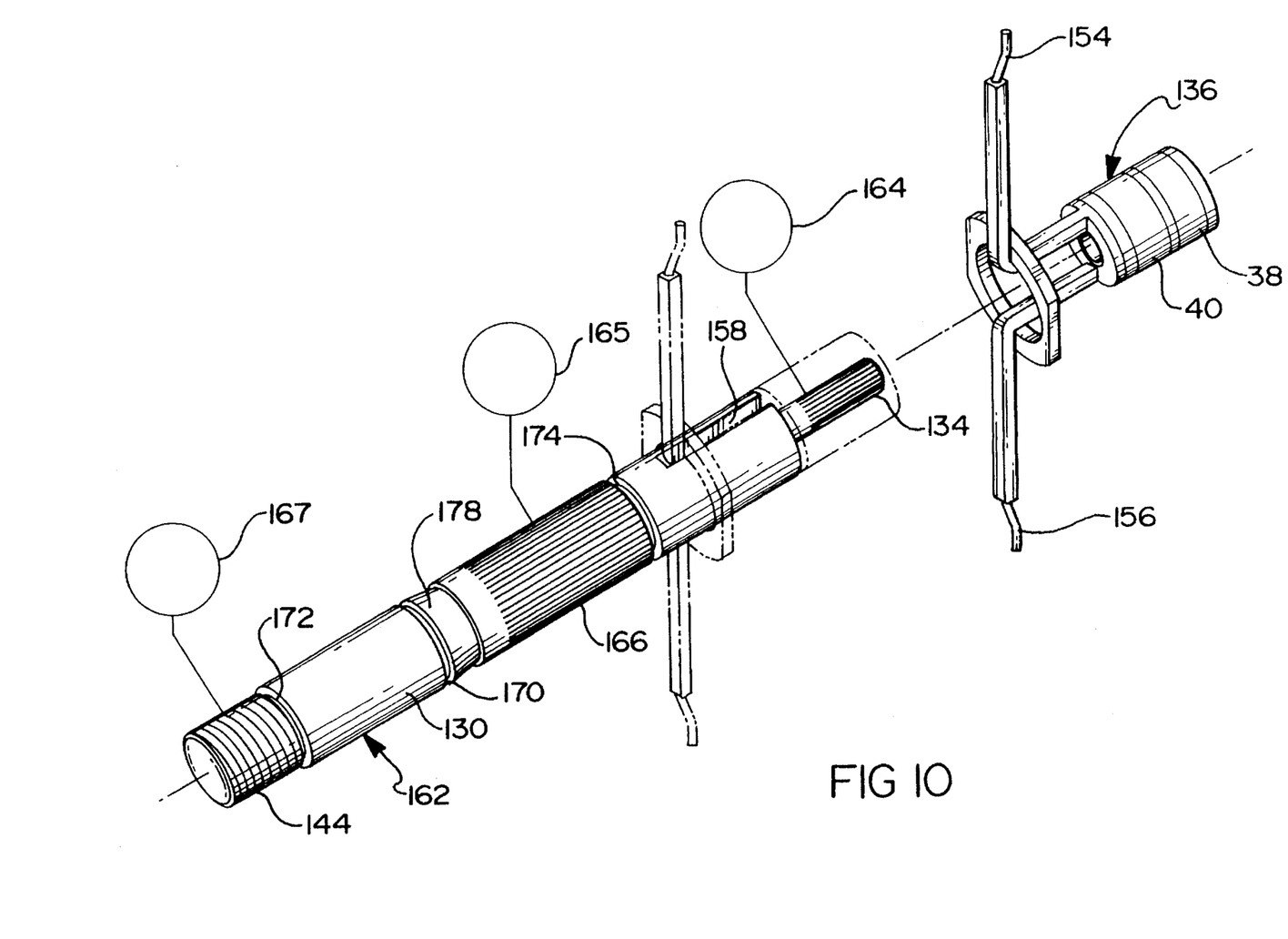
FIG. 10 is a perspective view of a cold headed rotor shaft for through-feed processing combined with a slip ring construction according to the present invention.

Referring now to FIG. 10, the shaft 160 in accordance with the present invention differs from the shaft 20 shown in FIGS. 1–9 in that it does not employ a collar 32 as in the shaft 20. Accordingly, the shaft 160 may be formed by cold heading in a series of steps, for example, the process shown in FIGS. 2, 3 and 4 and a through-feed machining series of steps. A preferred through-feed process includes axial displacement of the blank or the shaft 160 through at least one machining station such as a knurling or threading operation.

Preferably an O.D. grinding step to assure maximized diameter tolerance within 0.001 inch permits through-feed to a turning machine forming a snap ring groove 170 at the end to be threaded and an undercut 172 at that end as well as an overall length turning. A subsequent turning operation locates the finished end to turn a grinding relief groove 174 and the knurling from station 164 at reduced end 134. A subsequent turning station forms the rotor knurling 166, as shown at 165 while forming a rolled thread 144 at the end, as shown at 167. In addition, it is possible to machine the tapered land 178 for a steeper taper than may be made by cold heading if desired for mounting of a thrust ring. After the turning and rolling operations, the shaft is induction hardened and delivered to a plunge grinder for finish grinding of the bearing journals to hold to a precise tolerance.

Through-feed production permits the shaft 160 to be sequentially processed in multiple stations along a single direction, and does not require insertion and opposite direction removal steps for each individual production station. For example, the end knurling station 164 may be reached by axially displacing the shaft 160 in the same direction as it passed through the knurling station 165 for the rotor land 166. Similarly, the end threading station 167 producing the threaded end 144 may be formed at the same time or subsequently, after axial movement of the shaft in the same direction.

The shaft 160 receives a slip ring structure 136. The ring 136 includes shaped conductors 154 and 156 encapsulated by insert molding. In such a process, the shaped conductors 154 and 156 are inserted in a mold and then encapsulated with the insulating material forming the body of the slip ring 136. Such a slip ring formation avoids the need for radially aligned collar passages communicating with the axial passages 158 and 161 to guide the conductors radially from the axial grooves in the shaft. A through-feed displacement of the shaft 160 during production substantially simplifies the cold heading and the machine operations required to be performed on the shaft 160 before assembling the remaining alternator parts to the shaft. As a result, the present invention provides substantial production efficiencies over previously known alternator shaft and alternator assembly processes.

As a result, it will be understood that the cold headed shaft includes a cold headed axial groove extending through a bearing land, and avoids the difficult and time consuming and end milling operation as well as providing a narrow end without machining. A radial conductor lying in a groove extending through the adjacent collar or a rigid conductor insert molded to extend radially from the slip ring provide aligned access to conductors such as lead wires used to connect the windings through the axial grooves to the contact members 38 and 40 on the slip ring. As a result, the present invention avoids the laborious and expensive milling of alternator shafts, along with the attendant grain fracturing due to milling, previously required in order to form grooves in the shaft. The process also avoids the subsequent finishing operations, such as deburring, that waste material but were required to meet production specifications for the shaft. Moreover, the sequential steps practiced in the preferred embodiment prevent uncontrolled expansion or deformation of the slots during cold heading. Furthermore, the slip ring end portion is reduced sufficiently in size to permit a sufficiently deep groove in the bearing land that the slot properly receives and aligns the installed lead conductors during the assembly of the alternator. The shaft and the alternator production efficiency is substantially improved where the cold headed shaft structure is processed by through-feeding.

Having thus described the present invention, many modifications thereto will become apparent to those skilled in the art to which it pertains without departing from the scope and spirit of the present invention as defined in the appended claims.

What is claimed is:

1. A method for forming an alternator shaft carrying a protected conductor comprising:

cold heading a blank to form a rotor shaft with a conductor groove, including reducing an end portion of said blank by cold heading and extending an axially extending groove in said blank adjacent to the reduced end by cold heading and axially through-feeding said rotor shaft through at least one machining station in a single direction.

2. The method as defined in claim 1 wherein the conductor comprises a slip ring axially slidable over said reduced end and wherein said slip ring is installed by axial displacement over said reduced end.

3. The method as defined in claim 2 wherein said slip ring comprises a radially aligned conductor insert-molded in an encapsulating material, and aligning said conductor with said axially extending groove.

4. A method for constructing an alternator with a rotor shaft carrying a rotor, and having a bearing land on each axial side of said rotor, and having a reduced diameter shaft end for receiving a slip ring carrying a conductor, the method comprising:

cold heading a blank to form the shaft including reducing an end of the blank and extruding a groove in the blank adjacent the reduced end portion, and knurling a rotor land on said shaft by axially through-feeding said blank through a knurling station in a single direction after cold heading.

5. The method as defined in claim 4 and further comprising threading an end of said blank in an axially displaced position from said rotor land.

6. The method as defined in claim 4 and further comprising insert molding a conductor in an insulating material to form a slip ring.

7. A method for cold heading a blank to form a rotor shaft with a conductor groove comprising the steps of:

reducing an end portion of said blank, extruding an axially extending groove in said blank adjacent to the reduced end portion, upsetting a collar adjacent said groove, extruding a radially extending groove continuing to the periphery of the collar from said axially extending groove.

8. The method as defined in claim 7 wherein each groove extruding step comprises extruding two grooves in diametrically opposed positions in said blank.

9. The method as defined in claim 7 and further comprising reducing the opposite end portion.

10. The method as defined in claim 9 wherein said collar upsetting step begins concurrently with said opposite end reducing step.

11. The method as defined in claim 7 wherein said axially extending groove terminates short of said the collar prior to formation of the collar.

* * * * *